(12) United States Patent
DuFour (10) Patent No.: US 8,925,211 B2
(45) Date of Patent: Jan. 6, 2015

(54) LASER-BASED ALIGNMENT DEVICE AND ASSOCIATED METHODS THEREOF

(76) Inventor: Donald P. DuFour, Greene, ME (US)

( * ) Notice: Subject to any disclaimer, the term of this patent is extended or adjusted under 35 U.S.C. 154(b) by 161 days.

(21) Appl. No.: 13/351,777

(22) Filed: Jan. 17, 2012

(65) Prior Publication Data

US 2012/0180327 A1     Jul. 19, 2012

Related U.S. Application Data (60) Provisional application No. 61/432,734, filed on Jan. 14, 2011.

(51) Int. Cl.
*G01C 15/02*     (2006.01)
*G01C 15/00*     (2006.01)

(52) U.S. Cl.
CPC .................... *G01C 15/004* (2013.01)
USPC .............................. 33/277; 33/286

(58) Field of Classification Search
USPC ....... 33/277, 227, 228, 263, 275 R, 276, 281, 33/282, 285, 286, 288
See application file for complete search history.

(56) References Cited

U.S. PATENT DOCUMENTS

| | | | |
|---|---|---|---|
| 3,824,666 A * | 7/1974 | Roodvoets et al. ............... 72/37 |
| 3,874,088 A * | 4/1975 | Shaffer, Jr. ...................... 33/286 |
| 3,897,637 A | 8/1975 | Genho | |
| 4,446,626 A | 5/1984 | Grender et al. | |
| 4,598,481 A * | 7/1986 | Donahue ......................... 33/288 |
| 5,531,031 A | 7/1996 | Green | |
| 5,713,135 A | 2/1998 | Acopulos | |
| 5,864,956 A | 2/1999 | Dong | |
| 5,907,907 A | 6/1999 | Ohtomo et al. | |
| 5,983,510 A * | 11/1999 | Wu et al. ........................ 33/227 |
| 6,082,013 A | 7/2000 | Peterhans | |
| 6,124,935 A * | 9/2000 | Matthews ..................... 356/399 |
| 6,167,630 B1 | 1/2001 | Webb | |
| 6,170,163 B1 | 1/2001 | Bordignon et al. | |
| 6,230,416 B1 | 5/2001 | Trigilio | |
| 6,247,238 B1 * | 6/2001 | Harvey et al. ................... 33/286 |
| 6,256,895 B1 * | 7/2001 | Akers ............................. 33/286 |
| 6,314,650 B1 | 11/2001 | Falb | |
| 6,493,955 B1 * | 12/2002 | Moretti .......................... 33/451 |
| 6,732,439 B1 * | 5/2004 | Radke et al. .................... 33/286 |
| 6,735,879 B2 * | 5/2004 | Malard et al. ................... 33/286 |
| 6,739,062 B2 * | 5/2004 | Jan et al. ......................... 33/286 |
| 6,763,595 B1 | 7/2004 | Hersey | |
| 6,941,665 B1 | 9/2005 | Budrow et al. | |
| 7,100,293 B2 | 9/2006 | Kahle | |
| 7,124,513 B2 * | 10/2006 | Chen et al. ...................... 33/286 |
| 7,134,212 B2 * | 11/2006 | Marshall et al. ................ 33/286 |
| 7,165,332 B2 * | 1/2007 | McGrail et al. ................ 33/286 |
| 7,174,647 B2 | 2/2007 | Krantz et al. | |
| 7,266,898 B2 | 9/2007 | El-Katcha et al. | |
| 7,310,887 B2 * | 12/2007 | Nash et al. ...................... 33/286 |
| 7,367,129 B2 | 5/2008 | Lu | |
| 7,434,322 B2 * | 10/2008 | Walser et al. ................... 33/286 |
| 7,676,939 B2 | 3/2010 | Scheyer | |
| 2001/0049879 A1 | 12/2001 | Moore, Jr. | |

(Continued)

*Primary Examiner* — Christopher Fulton
(74) *Attorney, Agent, or Firm* — Berenato & White, LLC (57) ABSTRACT

The laser-based alignment device includes a housing and at least two laser devices affixed to the housing. Each of the at least two laser devices emits a laser beam. At least one alignment mechanism is positioned on the housing and is engagable to a structure, wherein the laser beam is positioned at a predetermined angle to the structure when the at least one alignment mechanism is attached to the structure.

5 Claims, 7 Drawing Sheets

(56) References Cited

U.S. PATENT DOCUMENTS

| | | |
|---|---|---|
| 2002/0152621 A1* | 10/2002 | Letourneau ............... 33/277 |
| 2006/0021235 A1* | 2/2006 | Becker ..................... 33/282 |
| 2006/0283029 A1* | 12/2006 | Jan et al. ................. 33/286 |
| 2010/0122466 A1* | 5/2010 | Hemingway et al. ....... 33/228 |
| 2012/0144682 A1* | 6/2012 | Vinati et al. .............. 33/263 |

\* cited by examiner

FIG. 7

LASER-BASED ALIGNMENT DEVICE AND ASSOCIATED METHODS THEREOF

CROSS REFERENCE TO RELATED APPLICATION

This application claims benefit of U.S. Provisional Application Ser. No. 61/432,734, entitled, "Laser-Based Alignment Device" filed Jan. 14, 2011, the entire disclosure of which is incorporated herein by reference.

FIELD OF THE DISCLOSURE

The present disclosure is generally related to alignment devices and more particularly is related to a laser-based alignment device and associated methods thereof.

BACKGROUND OF THE DISCLOSURE

Laser line levelers are tools that are used to level or align structures within various industries, such as the construction industry. Generally the laser line levelers include a laser that is positioned to emit a laser beam across a surface or throughout a room to display a horizontal or vertical illuminated line on a surface the laser line level is laid against. Laser line levelers are typically used wherever accurate verticals and horizontals are required. The laser beam may be fanned to produce a thin plane beam accurately horizontal or vertical, rather than a pinpoint beam. Similarly, the laser beam may be located on a rotating device, to produce a moving laser beam.

Although laser line levelers are successful at producing a straight line, they are only as accurate as their position relative to a structure. Within many industries, laser line levelers that are even slightly off alignment with the corresponding structure may present many problems. For example, within many shopping centers drop ceilings installed with laser line levelers that are slightly off alignment may produce unaligned ceiling grids. At large distances, a slight misalignment may create substantial alignment failures, which may require the time consuming task of re-aligning the ceiling grid.

Thus, a heretofore unaddressed need exists in the industry to address the aforementioned deficiencies and inadequacies.

SUMMARY OF THE DISCLOSURE

Embodiments of the present disclosure provide a system and method for a laser-based alignment device. Briefly described, in architecture, one embodiment of the system, among others, can be implemented as follows. The laser-based alignment device includes a housing and at least two laser devices affixed to the housing. Each of the at least two laser devices emits a laser beam. At least one alignment mechanism is positioned on the housing and is attachable to a structure, wherein the laser beam is positioned at a predetermined angle to the structure when the at least one alignment mechanism is attached to the structure.

The present disclosure can also be viewed as providing methods of using a laser-based alignment device. In this regard, one embodiment of such a method, among others, can be broadly summarized by the following steps: providing the laser-based alignment device having at least two laser devices affixed to a housing, wherein at least one laser beam is emitted from each of the at least two laser devices; and engaging at least one alignment mechanism to a structure, wherein the at least one alignment mechanism is positioned on the housing, thereby orienting the at least one laser beam at a predetermined angle with respect to the structure.

The present disclosure can also be viewed as systems for a multi-laser alignment device. Briefly described, in architecture, one embodiment of the system, among others, can be implemented as follows. The multi-laser alignment device has a housing having at least two perpendicularly oriented surfaces. A first laser device is positioned one of the two perpendicularly oriented surfaces, and a second laser device is positioned another of the two perpendicularly oriented surfaces, wherein each of the first and second laser devices emit at least one laser beam radially about the first and second laser devices, respectively. At least one alignment mechanism is positioned on the housing and engagable to a structure, wherein each of the laser beams are positioned at a predetermined angle to the structure when the at least one alignment mechanism is engaged with the structure.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
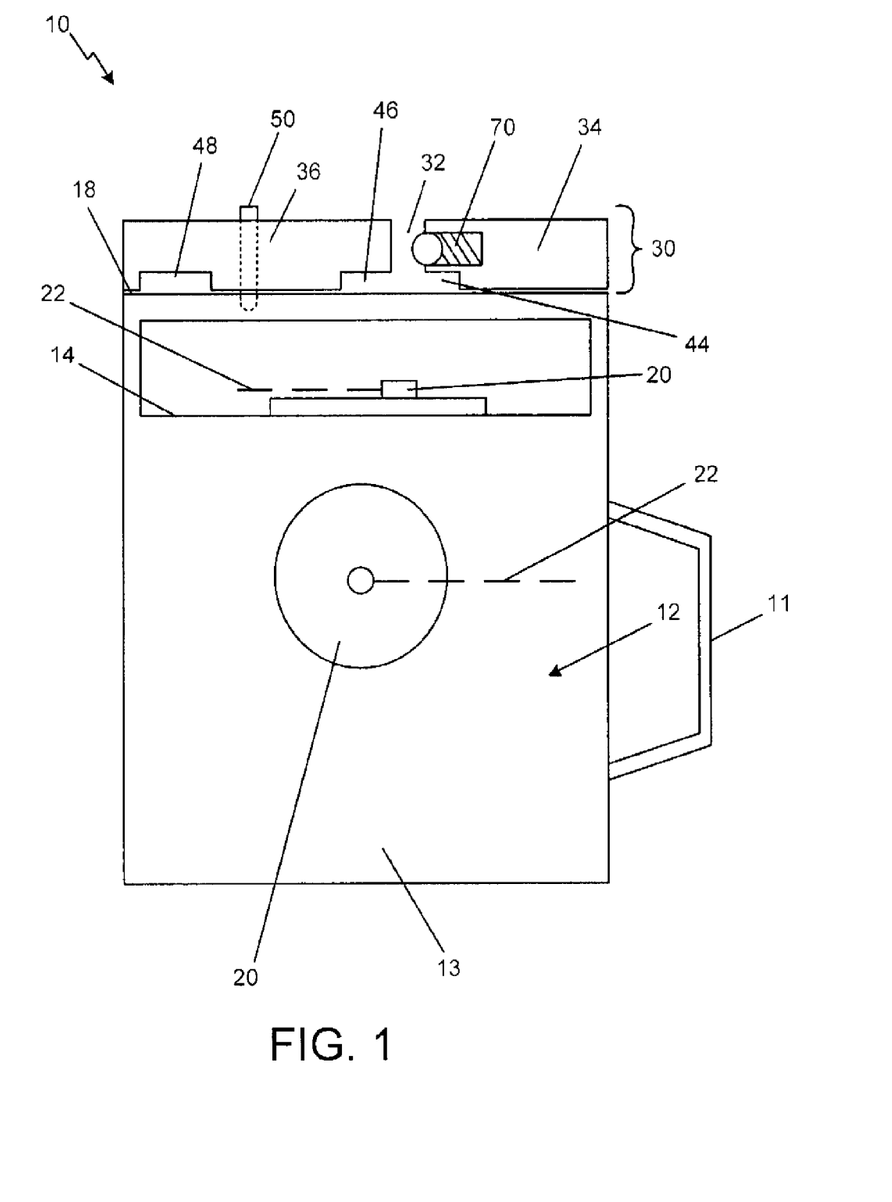
FIG. 1 is a cross-sectional illustration of a laser-based alignment device, in accordance with a first exemplary embodiment of the present disclosure.

FIG. 1 is a cross-sectional illustration of a laser-based alignment device 10, in accordance with a first exemplary embodiment of the present disclosure. The laser-based alignment device 10, which may also be referred to simply as device 10, includes a housing 12. At least two laser devices 20 are affixed to the housing 12. At least one laser beam 22 is emitted from each of the at least two laser devices 20. At least one alignment mechanism 30 is positioned on the housing 12 and engagable to a structure, wherein the laser beam 22 is positioned at a predetermined angle to the structure when the at least one alignment mechanism 30 is engaged with the structure.

The device 10 may be used for a variety of alignment purposes in a variety of industries, such as aligning, leveling and/or squaring ceiling grids with suspended ceilings. The device 10 may be used in any industry that requires or benefits from the alignment of structures, most particularly the construction industry wherein aligned walls, ceilings, floors and other structures are required. For example, commonly the device 10 may be used to install suspended ceilings while providing true and proper alignment of the support members of the suspended ceilings. As is discussed herein, the device 10 may engage with the support members of the suspended ceilings to provide flexible, but accurate, alignments from one support member to another. Of course, the device 10 may be used with a variety of other systems, including other ceiling systems, or in other construction projects with various alignment needs.

The device 10, as illustrated in FIG. 1, generally includes a housing 12 having at least two lasers devices 20. The housing 12 may be constructed from a variety of materials including plastics, metals or compounds thereof, and may include materials that are sufficiently strong enough to withstand the potential stresses of using the device 10. The housing 12 may include a variety of different shapes and configurations, all of which are considered within the scope of the present disclosure. The housing 12 may include a handle 11 to allow for convenient transportation of the device 10.

The laser device 20 may include any device or portion thereof that is capable of emitting a light, such as electromagnetic radiation, to form a substantially linear laser beam. For example, the laser device 20 may create a laser beam through a process of optical amplification based on a stimulated emission of protons, wherein the laser beam has any number of characteristics, such as wavelengths, frequencies, phases, sizes and lengths. The laser devices 20 may be used with other devices, such as gyro or self-leveling devices, as is conventionally known. The laser devices 20 are configured to emit a radial laser beam 22 from a central point. Within the industry, this may be known as a rotary laser, which is commonly used to align various structures along a single plane formed by the beam of the laser when it moves in a rotary fashion. Rotation of the laser beam 22 may be accomplished through the use of any type of rotation device that is incorporated within the laser device.

As can be seen, when the laser device 20 is operating and the rotation device is in use, the laser beam 22 may be projected radially within a plane about the central point. The device 10 includes at least two laser devices 20, preferably oriented perpendicular to one another. For example, as is illustrated in FIG. 1, a first laser device 20 is situated to emit a radial laser beam 22 parallel to the plane of a side 13 of the housing 12, and a second laser device 20 is situated to emit a radial laser beam 22 parallel to the plane a surface of a middle area 14 of the housing 12. The device 10 may also include any additional number of laser devices 20, or any single laser device 20, all of which are considered within the scope of the present disclosure.

For example, another description of the positioning of components on the device 10 may include a housing 12 having at least two perpendicularly oriented surfaces. One of the at least two laser devices 20 is positioned one of two perpendicularly oriented surfaces of the housing, and the other of the at least two laser devices 20 is positioned another of the two perpendicularly oriented surfaces of the housing 12. Each of the two laser devices 20 emits at least one laser beam 22 radially about at least two laser devices 20, respectively. The at least one alignment mechanism 30 is positioned on the housing 12 and engagable to the structure. Each of the laser beams 22 are positioned at a predetermined angle to the structure when the at least one alignment mechanism 30 is engaged with the structure. One of the two laser devices 20 is positioned within the middle area 14 of the housing 12, wherein this laser device 20 is positioned directly below the at least one alignment mechanism 30.

The device includes an alignment mechanism 30 for aligning at least one of the laser beams 22 with an external structure. The alignment mechanism 30 may include a plurality of various configurations and designs, and may generally include a slotted area 32 created from a first alignment block 34 and a second alignment block 36. Additionally, the alignment mechanism 30 may include a secondary engagement area 48 within either of the first and second alignment blocks 34, 36. The alignment mechanism 30 may also include other types of alignment blocks, including but not limited to, squares, levels, and/or other alignment elements. The alignment mechanism 30 may include a plurality of areas for engaging with a structure, wherein at least one of the laser devices 20 may create an alignment marking with the laser beam 22 that is aligned to the structure.

Generally, in use, the structure may be positioned within the slotted area 32, or the secondary engagement area 48. Although use of the device 10 may vary, the slotted area 32 may best receive an inverted T-shaped structure, such as is commonly used as a center support member of a suspended ceiling. Similarly, the secondary engagement area 48 may best receive an L-shaped structure that is commonly used as a perimeter support member of a suspended ceiling. Accordingly, for the use of the alignment mechanism 30 with an inverted T-shape structure, the inverted T-shape structure may be positioned within the slotted area 32 between the first and second engagement block 34, 36. Likewise, the L-shaped structure may be positioned within the secondary engagement area 48 between the second alignment block 36 and the housing 12. To insert or remove any structure from within the slotted area 32 or the secondary engagement area 48, the first and/or second engagement block 34, 36 may be moved with respect to the housing. A fastener, such as a removable, biased, or threaded fastener, may be used to retain the first or second engagement blocks 34, 36 in a stationary position on the housing 12.

When the device 10 is in use, the laser beam 22 will create a laser marking on a surface positioned proximate thereto. For example, the laser beam 22 will create a laser marking on a nearby wall, ceiling, floor, or other structure that the laser beam 22 contacts. The laser marking may be characterized as the portion of the laser beam 22 that contacts a surface and is visibly identifiable. The laser marking will have an orientation that is relative to the laser beam 22, i.e., for a rotary laser beam 22, the laser marking will be about the circumference of the rotational path. The laser marking may have various orientations with respect to the structure or on the surface, including a parallel orientation, a perpendicular orientation, and/or a level orientation. For example, the alignment mechanism 30 may allow the laser beam 22 to be at substantially a 90° angle with the structure, a 180° angle with the structure or any other alignment angle. Any type of alignment may be achievable with the alignment mechanism 30.

Although the device 10 may be used for aligning a variety of structures, including walls and ceilings, it is particularly suited for properly aligning a drop ceiling, which may also be known as a suspended or false ceiling. Conventionally, a drop ceiling is a secondary ceiling that is hung below a main or structural ceiling. The plenum space formed between the drop ceiling and the structural ceiling may be used to easily conceal heating, ventilation and air conditioning (HVAC) elements, piping, wiring and/or ductwork. The drop ceiling conventionally uses a grid-work of support members, often having an inverted T-shape, that are suspended from wires affixed to the structural ceiling. Other shaped support members are also used in place of, or in combination with the inverted T-shape members, i.e., such as an L-shaped support with the perimeter of the grid-work which abuts a wall. As will be explained herein, the device 10 may be used to properly and efficiently align any of the support members used with a drop ceiling, regardless of size or design of the drop ceiling.

As illustrated in FIG. 1, the slotted area 32 and/or the secondary engagement area 48 of the alignment mechanism 30 may be sized to engage any structural member where alignment is needed or desired. To allow engagement with a structural member, such as a support member of a drop ceiling, any combination of the second alignment block 36 and/or the first alignment block 34 may be removable, or slidable along the top 18 of the device 10. For example, the second alignment block 36 may be slidable in relation to the first alignment block 34, whereby the size of slotted area 32 may be adjustable, i.e., made larger or smaller. This allows either or both of the first and second alignment blocks 34, 36 to be placed in a position to engage with the structural member and have it placed within engagement areas 44, 46 of the first and second alignment blocks 34, 36, respectively (shown in FIG. 2). Movement of either of the first and second alignment blocks 34, 36 may be restricted by a fastener 50, which may include any type of fastener, threaded fastener, thumb screw, latch or similar device.

The device 10 also includes at least one biased retaining device 70 positioned within the at least one alignment mechanism 30, and preferably within one of the first or second alignment blocks 34, 36, and more preferably within the stationary first alignment block 34. The biased retaining device 70 may assist with retaining the structure 60 in an engaged position with the at least one alignment mechanism 30. The biasing device 70 may be biased into a groove within the structure 60, to align and square the device 10 with respect to the structure. For example, in common suspended ceiling supports, there is a groove within the support member every few inches, such as every 6 inches, for example. The biased retaining device 70 may engage with this groove to align the device 10 based on the positioning of the groove. In turn, this may allow the device 10 to be properly positioned, aligned, and squared, such that the laser beam 22 can indicate the proper position for placement of the next ceiling support.

The biased retaining device 70 may use a biasing structure, such as a spring, to apply a force on a structure 60 that it contacts. For example, when the structure 60 is placed within the slotted area 32, it may push the biased retaining devices 70 against the springs. After the structure 60 is in position within the slotted area 32, the springs may bias the biased retaining device 70 to contact the structure 60 and engage with the groove within the structure to retain the device in place. The biased retaining device 70 may be used with other components of the device 10, or in varied configurations. The biased retaining device 70 may be positioned in a specific location within the device 10. For example, common suspended ceiling supports have grooves every six inches. The biased retaining device 70 may be positioned such that there is a six inch distance between the biased retaining device 70 and the laser device 20. Of course, other distances between the biased retaining device 70 and the laser device 20 may be used as well, as may depend on the intended use of the device 10.

Figure 2:
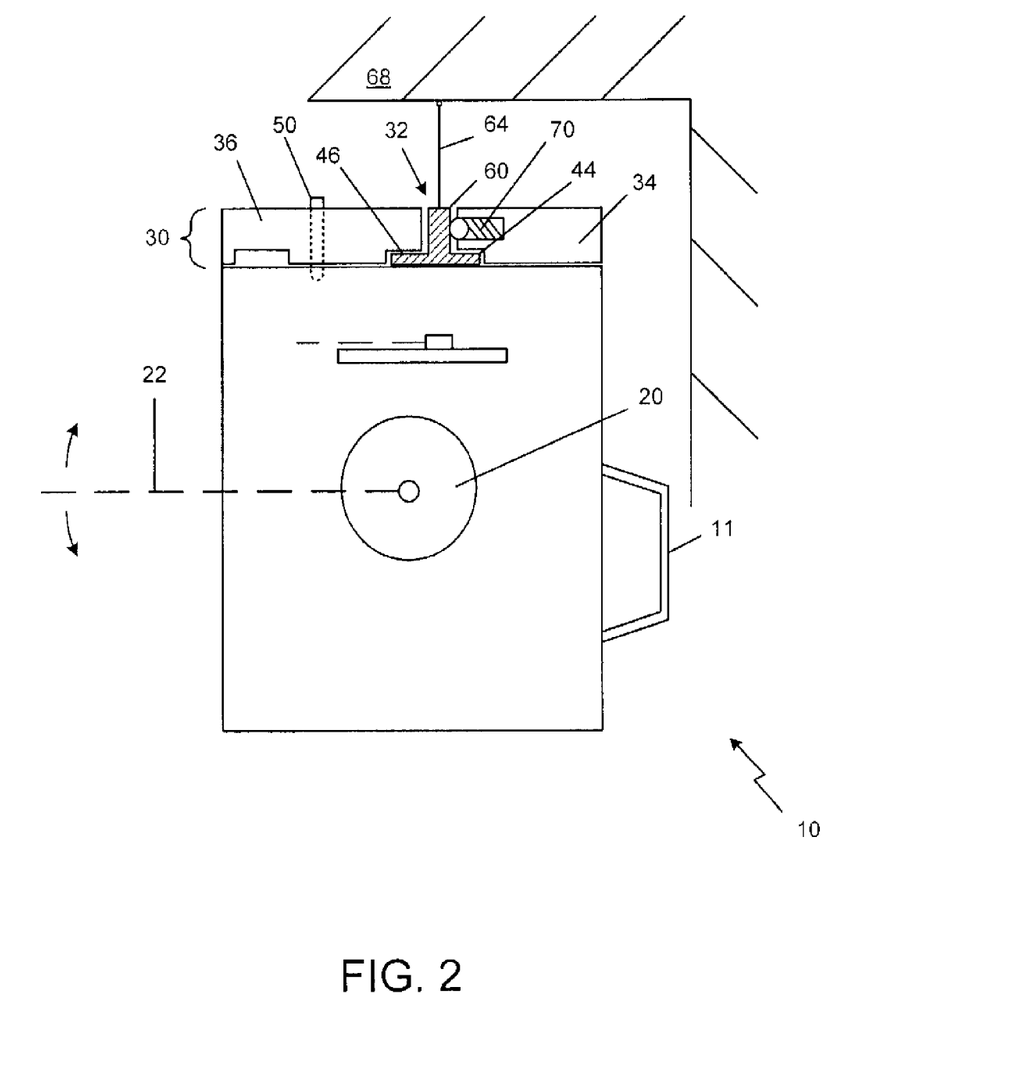
FIG. 2 is a cross-sectional illustration of the laser-based alignment device of FIG. 1, in a working position, in accordance with a first exemplary embodiment of the present disclosure.
Figure 3:
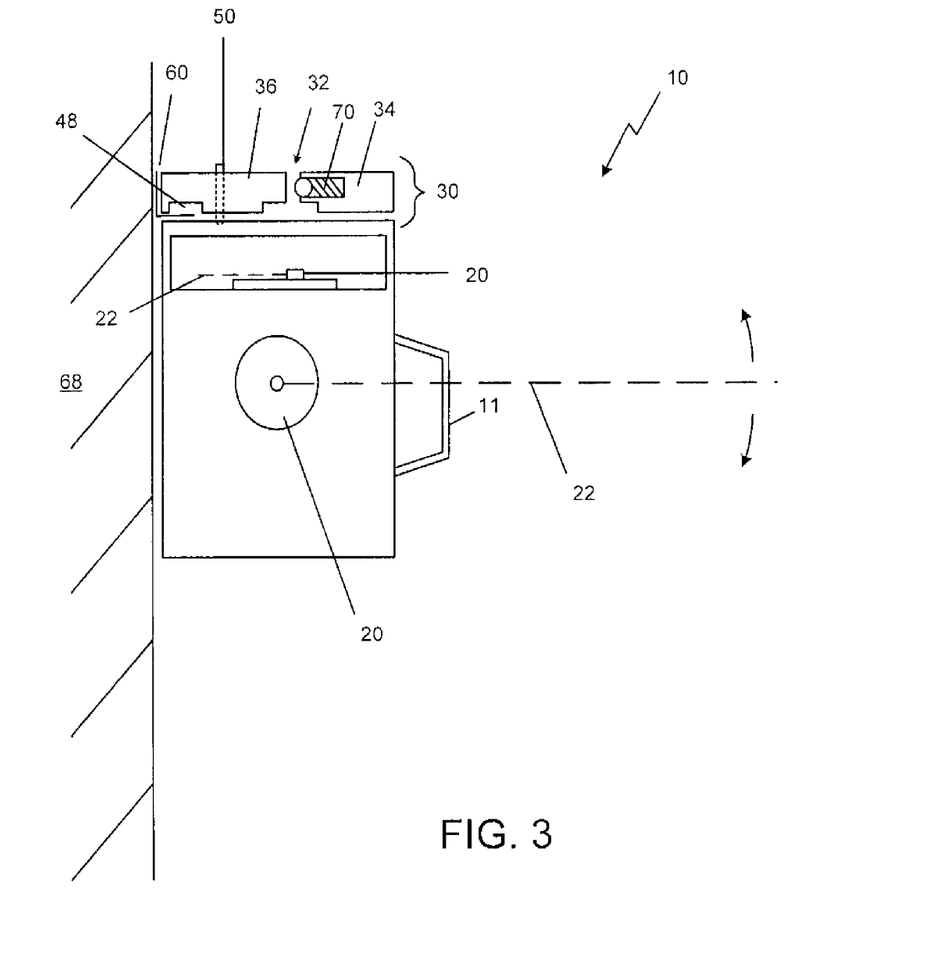
FIG. 3 is a cross-sectional illustration of the laser-based alignment device of FIG. 1, in a working position, in accordance with a first exemplary embodiment of the present disclosure.

FIGS. 2 and 3 are cross-sectional illustrations of the laser-based alignment device 10 of FIG. 1, in working positions, in accordance with a first exemplary embodiment of the present disclosure. The device 10 may be positioned to engage with a support member 60 in a number of configurations. For example, as is shown in FIG. 2, the second alignment block 36 is positioned to allow the support member 60, affixed to a ceiling 68 with a wire 64, to be placed in the slotted area 32, and then positioned to engage the support member 60. In this configuration, the support member 60 may be retained in the slotted area 32 and in engagement areas 44, 46 of the first and second alignment blocks 34, 36, respectively. A biased retaining device 70 may assist with retaining the structure 60 in an engaged position with the alignment mechanism 30 by engaging with a groove within the structure 60. In FIG. 2, the biased retaining device 70 is shown in a contacted position with the structure 60 for clarity in disclosure, to simulate positioning of the biased retaining device 70 within a groove of the structure 60. The laser device 20 may then emit laser beam 22 radially about the device 10, as identified by the arrows, thereby creating an alignment marking that is perpendicular to the length of the support member 60. This allows an installer of the drop ceiling to properly align an additional member of the ceiling grid-work in relation to the support member 60. It is noted that the slotted area 32 may also be configured to hold support members 60 that are not inverted T-shape, thereby allowing the device 10 to be used with a variety of different structures.

As is shown in FIG. 3, the secondary engagement area 48 may also be used to engage with a support member for alignment purposes. For example, when installing the drop ceiling, a worker may first install a perimeter support member 60 of the grid-work along the wall 68 of a room, which may be L-shaped and affixed to the wall 68, as shown in FIG. 3. The secondary engagement area 48 may then be engaged with a portion of the support member 60, such as a portion of the "L" shaped support, as is shown in FIG. 3. Once the portion of the "L" shaped support is within the secondary engagement area 48, the fastener 50 may be used to retain the second alignment block 36 in a stationary or locked position. The laser device 20 may then emit laser beam 22 radially about the device 10, as identified by the arrows, thereby creating an alignment marking that is perpendicular to the length of the support member 60. Again, an installer of the drop ceiling may use this marking to properly align an additional member of the ceiling grid-work in relation to the support member 60.

In addition, the device 10 may also be used to create markings used for leveling structures. For example, in FIG. 3, the device 10 includes two laser devices 20; one on the side of the device 10 and one on the top of the device 10. As discussed above, the laser device 20 on the side of the device 10 may be used to create a marking that is perpendicular to the length of the support member 60, which may be used to properly install the grid-work. The laser device 20 on the top of the device 10 may be used to create a marking that is level in relation to the support member 60. This allows an installer to install the grid-work of support members 60 about the perimeter of a room level, thereby creating a level drop ceiling. This leveling ability may also be used with alignment mechanism 30 of FIG. 2, although it is primarily intended for assisting with initially leveling the perimeter grid-work of support members 60.

It is noted that other configurations and designs are available with the device 10, all of which are considered within the scope of the present disclosure. For example, the alignment mechanism 30 may be located on any portion of the device 10 and may include any type of engagement structures for engaging a support member 60. This may include engagement structures that have particular shapes, textures and characteristics that permit, assist and/or enhance the ability to determine alignment with the support structure.

Figure 4:
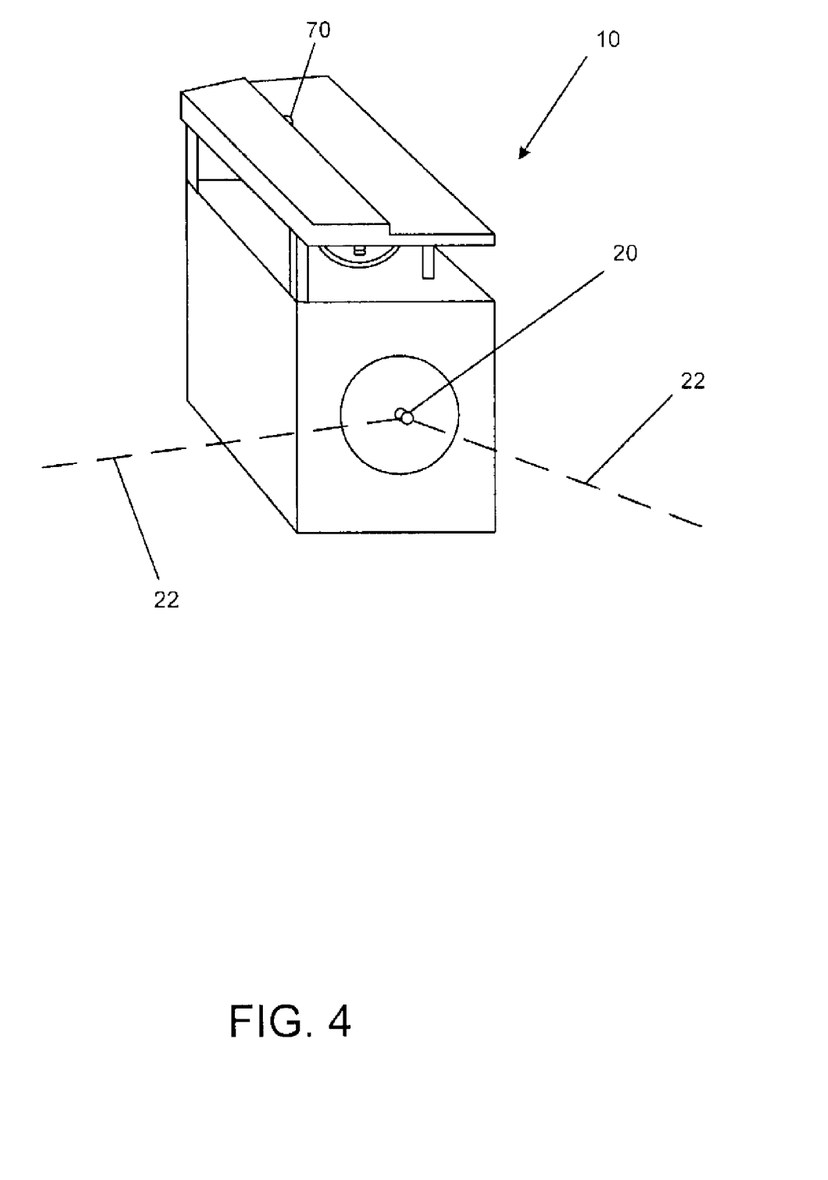
FIG. 4 is a plan view illustration of a laser-based alignment device, in accordance with the first exemplary embodiment of the present disclosure.

FIG. 4 is a plan view illustration of a laser-based alignment device 10, in accordance with the first exemplary embodiment of the present disclosure. As is shown, the biased retaining device 70 may be positioned within the device 10 in a specific location. For example, the linear distance between the biased retaining device 70 and the laser device 20 that is positioned on the side of the device 10, may be approximately six inches. This is designed to correspond to the distance between grooves on a suspended ceiling support member. Other distances may also be used for support members or structures that have differently spaced grooves.

Figure 5:
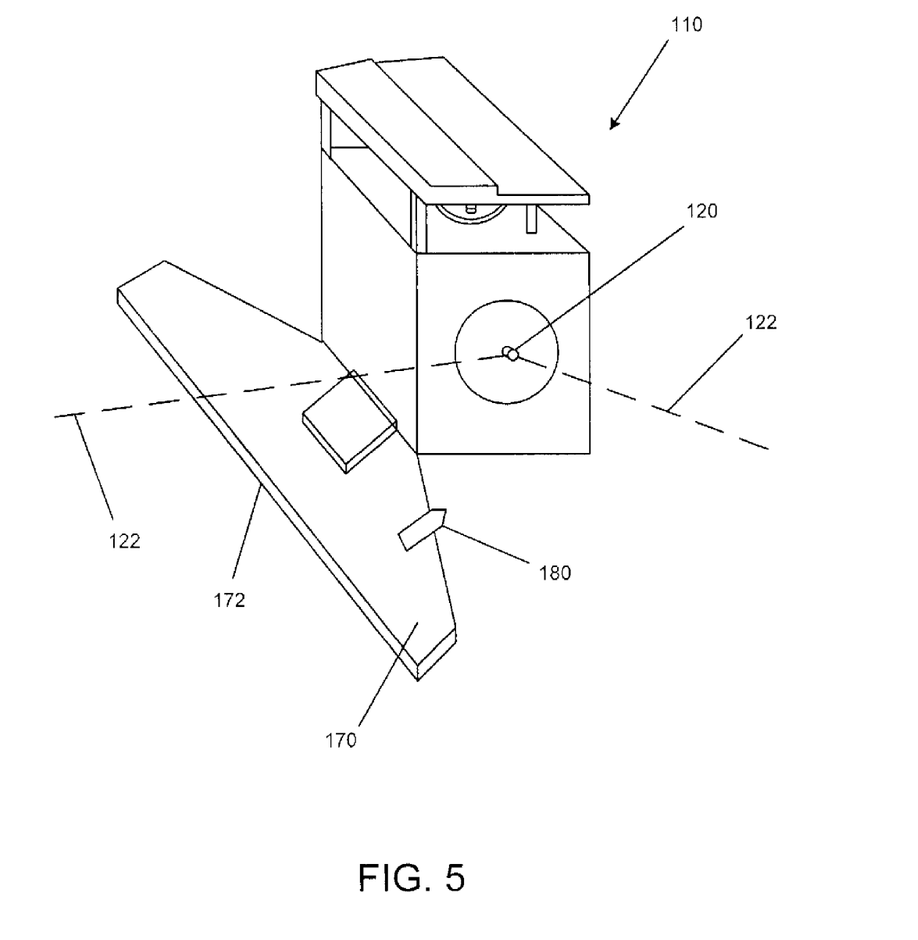
FIG. 5 is a plan view illustration of a laser-based alignment device, in accordance with a second exemplary embodiment of the present disclosure.

FIG. 5 is a plan view illustration of a laser-based alignment device 110, in accordance with a second exemplary embodiment of the present disclosure. The laser-based alignment device 110, which may be referred herein as device 110, includes a housing 112. At least two laser devices 120 are affixed to the housing 112. At least one laser beam 122 is emitted from each of the at least two laser devices 120. At least one alignment structure 170 is positioned on the housing 112 and engagable to a structure 160, wherein the laser beam 122 is positioned at a predetermined angle to the structure when the at least one alignment structure 170 is engaged with the structure.

The device 110 is configured to create an alignment marking with a laser beam 122 in relation to a wall, or other elongated feature. The device 110 includes a laser mechanism 120 emitting the laser beam 122 axially about the device 110, as is identified by the arrows in FIG. 5. The alignment structure 170 may be removably engagable with the device 110 such that a face 172 of the alignment structure 170 is perpendicular with the laser beam 122. The device includes an alignment structure 170 that is positioned to abut a substantially linear structure, such as a wall. For example, the alignment structure 170 may be engagable with the wall by contacting the wall in a position that is flush up against the wall. The face 172 of the alignment structure 170 may be considered a wall abutment edge, which is sized to engage with the wall by flushly contacting the wall. When the face 172 of the alignment structure 170 engages with the wall, i.e., is positioned flush up against the wall, the laser beam 122 may create a laser marking on a floor.

In use, the device 110 may be positioned up against a wall, such that the face 172 of the alignment structure 170 abuts the wall. An indicator 180 positioned on the alignment structure 170 may be used to indicate where the laser marking or path from the laser beam 122 will be located. A worker may align the indicator 180 with a marking on the floor, such as a marking that was measured prior to placing the device 110 proximate to the wall. Once the indicator 180 is aligned with the mark, the device 110 may be activated, in which the laser device 120 may rotate while emitting the laser beam 122 therefrom. The laser beam 122 will create a visible rotational laser marking along any surface that it contacts. The worker may then use this visible laser marking to align various construction structures, such as ceiling support members, framing structure, or any other structure.

Figure 6:
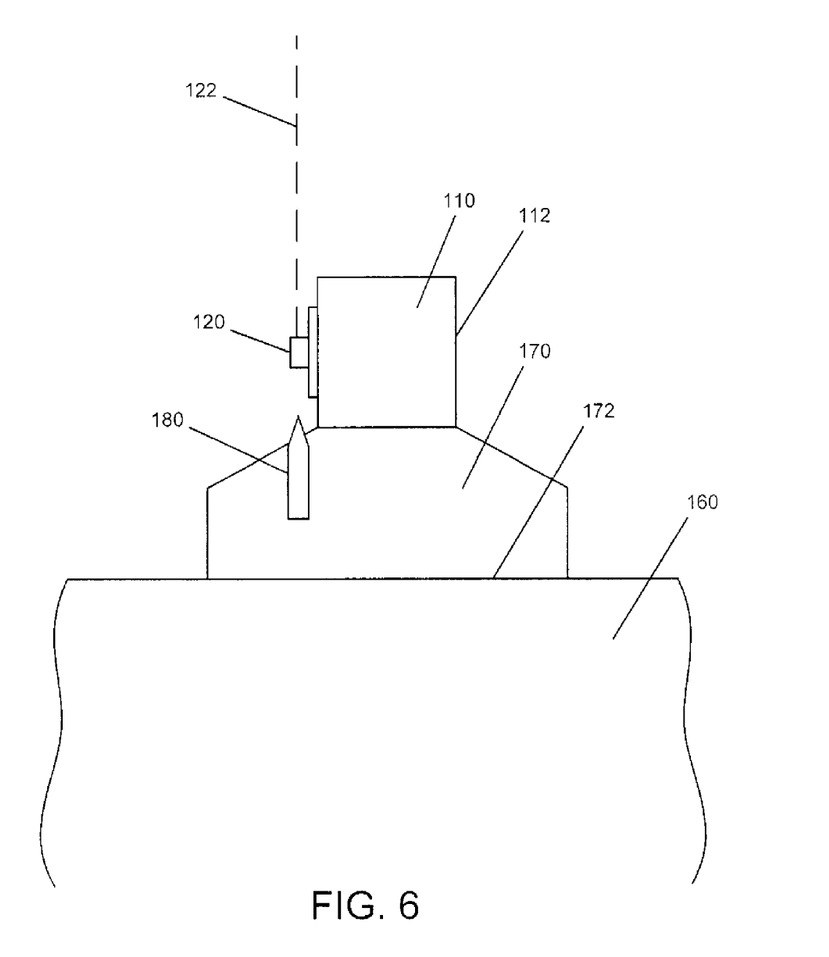
FIG. 6 is a top view illustration of the laser-based alignment device, in accordance with the second exemplary embodiment of the present disclosure.

FIG. 6 is a top view illustration of the laser-based alignment device 110 of FIG. 4, in accordance with the second exemplary embodiment of the present disclosure. Specifically, FIG. 6 illustrates a top view of the device 110 while it is in use. As is shown, the device 110 may be placed proximate to a wall 160, or another substantially linear structure, wherein the face 172 of the alignment structure 170 is flush against the wall 160. In this position, the laser device 120 may emit the laser beam 122 perpendicular to the wall 160 to create a marking radially about the device 110. An indicator 180 may be used to help align the laser beam 122 to a specific or predetermined position.

In accordance with all embodiments disclosed herein, it is noted that any of the features described may be used in any combination with other features described herein, conventionally known tools or techniques, and/or non-conventional tools or techniques. For example, the alignment mechanism 30 of the first exemplary embodiment may be used on the device 110 of the second exemplary embodiment in combination with the alignment structure 170. This may allow one device 10 to have a plurality of uses, including alignment of support members for a drop ceiling, leveling of support members and squaring of support members, as discussed through this disclosure.

Furthermore, any number of additional features may be included with any of the disclosures of the first, second, and/or third exemplary embodiments disclosed herein. Various features may be used to enhance the use and/or ability of the devices disclosed herein. This may include magnetic features to help stabilize the device during use and/or any number of markings to assist a user with proper alignment of the device. Additionally, any type of written text or pictoral images may be located on the exterior of the device. The device and the components thereof may be formed from any number of individual parts and affixed together, as may vary by design. Likewise, the device may include beveled edges, chamfers or other surface features to prevent particulate build-up, thereby ensuring a more proper alignment.

Figure 7:
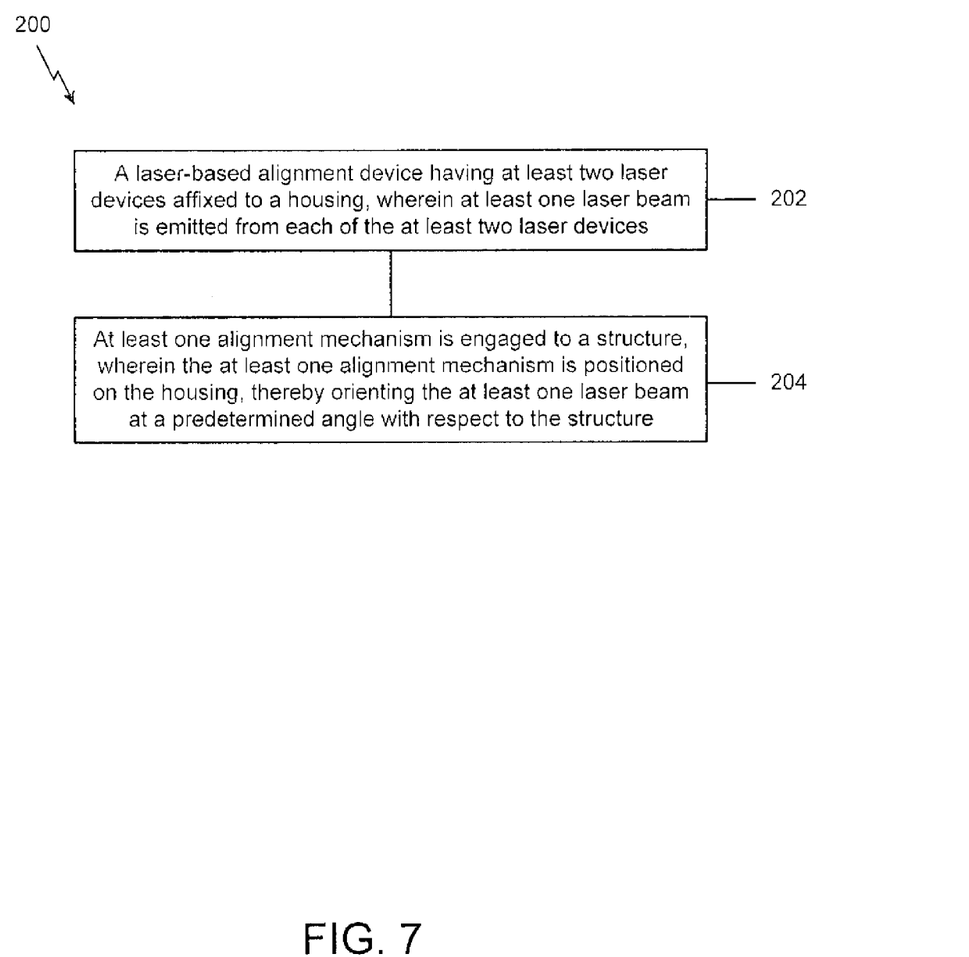
FIG. 7 is a flowchart illustrating a method of using a laser-based alignment device in accordance with the first exemplary embodiment of the disclosure.

FIG. 7 is a flowchart 200 illustrating a method of using a laser-based alignment device in accordance with the first exemplary embodiment of the disclosure. It should be noted that any process descriptions or blocks in flow charts should be understood as representing modules, segments, portions of code, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

As is shown by block 202, a laser-based alignment device having at least two laser devices affixed to a housing, wherein at least one laser beam is emitted from each of the at least two laser devices. At least one alignment mechanism is engaged to a structure, wherein the at least one alignment mechanism is positioned on the housing, thereby orienting the at least one laser beam at a predetermined angle with respect to the structure (block 204). The method may include an additional number of steps or variations thereof. For example, a laser marking may be created with the at least one laser beam on a surface positioned proximate to the laser-based alignment device, wherein the laser marking on the surface has at least one of a parallel orientation, a perpendicular orientation, and a level orientation with respect to the structure. Additionally, the structure may be positioned within a first engagement area formed between at least one alignment block and the housing, or within a second engagement area formed between at least two alignment blocks engagable with the housing.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A laser-based alignment device comprising: a housing configured with a first surface oriented substantially parallel to a second surface and substantially perpendicular to a third surface and to a fourth surface, the third surface being a top surface and the forth surface being a bottom surface; two laser devices affixed to the housing and configured to emit at least one laser beam perpendicular to said first surface from each of the two laser devices; a first and a second alignment mechanism positioned on said third surface said first alignment mechanism adapted to engage an L-shaped component of a suspended ceiling system; a second alignment mechanism adapted to engage a T-shaped support component of a suspended ceiling system; an alignment structure positioned on said first surface aligned in the plane of the fourth surface and adapted to engage a wall surface to provide an offset between said first surface and said wall surface substantially equal to the width of said L-shaped component, said at least one laser beam from each laser device being positioned at a 90 degree angle to said L-shaped component when said first alignment mechanism is engaged with said L-shaped component; said at least one laser beam from each laser device being positioned at a 90 degree angle to said T-shaped component when said second alignment mechanism is engaged with said T-shaped component, wherein a biased retaining device positioned within said second alignment mechanism is adapted to engage a groove if present in said T-shaped component, and wherein a laser marking is created by said at least one laser beam from each laser device on a surface positioned proximate thereto, the laser marking on the surface having at least one of a parallel orientation, a perpendicular orientation, and a level orientation with respect to said L-shaped component or said T-shaped component.

2. The laser-based alignment device of claim 1, wherein a first laser device of the two laser devices is positioned to emit one laser beam along a first plane, and a second laser device of the two laser devices is positioned to emit one laser beam along a second plane, and the first plane is perpendicular to and intersects the second plane.

3. The laser-based alignment device of claim 1, said alignment structure further comprising an elongated wall abutment edge positioned parallel to said first surface and within the plane of the fourth surface, wherein the wall abutment edge is sized to engage with a wall by flushly contacting the wall.

4. The laser-based alignment device of claim 3, wherein when said housing is placed on a floor and the wall abutment edge is flushly contacting the wall surface, at least one of the laser beams creates a laser marking on said floor.

5. A method of using a laser-based alignment device, the method comprising the steps of: providing the laser-based alignment device including two laser devices, two alignment mechanisms, and an alignment structure affixed to a housing, wherein at least one laser beam is emitted from each of the at least two laser devices perpendicular to a first surface on said housing; engaging said alignment structure to a wall surface; engaging a first alignment mechanism to an L-shaped component of a suspended ceiling system, said component being mounted on said wall surface; positioning said first alignment mechanism on the housing to align said first surface with said wall surface, thereby orienting the at least one laser beam emitted from each said laser device at a 90 degree angle with respect to said L-shaped component, one laser beam being emitted along a first plane, and the other laser beam being emitted along a second plane, where the first plane is perpendicular to and intersects the second plane.

* * * * *